United States Patent
Faith

(10) Patent No.: US 8,434,675 B2
(45) Date of Patent: May 7, 2013

(54) CRACK EMBOSSING USING DIAMOND TECHNOLOGY

(75) Inventor: Patrick Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/075,270

(22) Filed: Mar. 30, 2011

(65) Prior Publication Data

US 2011/0284626 A1 Nov. 24, 2011

Related U.S. Application Data

(60) Provisional application No. 61/320,602, filed on Apr. 2, 2010.

(51) Int. Cl.
- *G06F 17/00* (2006.01)
- *G06F 7/08* (2006.01)
- *G06Q 40/00* (2012.01)
- *G07D 11/00* (2006.01)
- *G07F 19/00* (2006.01)
- *G06K 5/00* (2006.01)
- *G06K 19/00* (2006.01)
- *G06K 19/06* (2006.01)
- *B44F 1/06* (2006.01)
- *D06N 7/04* (2006.01)

(52) U.S. Cl.
USPC ........... 235/375; 235/379; 235/380; 235/381; 235/487; 235/492; 235/493; 428/155

(58) Field of Classification Search .......... 235/379–381, 235/487, 492, 493, 375; 428/155
See application file for complete search history.

(56) References Cited

U.S. PATENT DOCUMENTS

| | | | | |
|---|---|---|---|---|
| 4,931,629 | A * | 6/1990 | Frankfurt | 235/488 |
| 5,270,077 | A * | 12/1993 | Knemeyer et al. | 427/249.8 |
| 5,523,121 | A * | 6/1996 | Anthony et al. | 427/249.11 |
| 5,626,922 | A * | 5/1997 | Miyanaga et al. | 427/535 |
| 5,853,888 | A * | 12/1998 | Dutta et al. | 428/408 |
| 5,879,775 | A * | 3/1999 | Walter et al. | 428/76 |
| 6,091,131 | A * | 7/2000 | Cook et al. | 257/629 |
| 6,126,741 | A * | 10/2000 | Jones et al. | 117/7 |
| 6,193,156 | B1 | 2/2001 | Han et al. | |
| 6,306,510 | B1 | 10/2001 | Verlinden et al. | |
| 6,673,439 | B1 * | 1/2004 | Miyamoto et al. | 428/336 |

(Continued)

FOREIGN PATENT DOCUMENTS

| | | |
|---|---|---|
| JP | 2006-247871 A | 9/2006 |
| JP | 2008-080504 A | 4/2008 |
| WO | 02/50790 A1 | 6/2002 |

OTHER PUBLICATIONS

Search/Examination Report dated Jan. 2, 2012 from International Patent Application No. PCT/US2011/030562, 9 pages.

*Primary Examiner* — Daniel Walsh
(74) *Attorney, Agent, or Firm* — Kilpatrick, Townsend & Stockton

(57) ABSTRACT

A portable consumer device having a substrate layer, a protective layer and a diamond-based brittle material layer having an intentionally created unique fissure or cracked patterns or crystal zone boundaries and systems and methods for making and using same are disclosed. The diamond-based brittle material layer includes a diamond material. The unique random fissure or cracked pattern and crystal zone boundaries, or the electromagnetic signature based thereon, of the brittle material layer are detected and used to authenticate the portable consumer device.

9 Claims, 8 Drawing Sheets

U.S. PATENT DOCUMENTS

| | | |
|---|---|---|
| 6,760,472 B1 | 7/2004 | Takeda et al. |
| 6,769,616 B2 | 8/2004 | Fu et al. |
| 7,497,379 B2 | 3/2009 | Chen et al. |
| 7,793,837 B1 | 9/2010 | Faith et al. |
| 8,020,764 B2 | 9/2011 | Faith et al. |
| 8,079,529 B2 | 12/2011 | Faith et al. |
| 2001/0031346 A1* | 10/2001 | Iwamura ............... 428/212 |
| 2001/0044028 A1* | 11/2001 | Anderson et al. ......... 428/408 |
| 2001/0044029 A1* | 11/2001 | Fujii et al. ............. 428/408 |
| 2002/0096569 A1* | 7/2002 | Boutaghou et al. ....... 235/493 |
| 2003/0112118 A1 | 6/2003 | Raslan |
| 2004/0107648 A1* | 6/2004 | Sung ................... 51/295 |
| 2004/0151827 A1* | 8/2004 | Argoitia et al. ............ 427/7 |
| 2004/0180216 A1* | 9/2004 | Veerasamy et al. ........ 428/432 |
| 2004/0233586 A1* | 11/2004 | Suda .................... 360/313 |
| 2005/0168339 A1* | 8/2005 | Arai et al. .............. 340/572.8 |
| 2006/0035080 A1* | 2/2006 | Argoitia ................. 428/402 |
| 2006/0038014 A1* | 2/2006 | Mann et al. ............. 235/449 |
| 2006/0086802 A1* | 4/2006 | Tolkowsky ............. 235/487 |
| 2006/0185533 A1 | 8/2006 | Saueressig |
| 2006/0240260 A1* | 10/2006 | Heino et al. ............. 428/408 |
| 2006/0267230 A1* | 11/2006 | Rha et al. ................ 264/39 |
| 2007/0111031 A1* | 5/2007 | Isberg et al. ............. 428/698 |
| 2007/0148374 A1* | 6/2007 | Twitchen et al. ........... 428/29 |
| 2007/0176093 A1* | 8/2007 | Kukla et al. ............. 250/288 |
| 2007/0200710 A1* | 8/2007 | Feltz et al. .............. 340/572.7 |
| 2008/0134912 A1* | 6/2008 | Golan .................... 101/32 |
| 2008/0149700 A1 | 6/2008 | Tuyls et al. |
| 2009/0080954 A1* | 3/2009 | Miyata et al. ............ 399/329 |
| 2010/0206767 A1* | 8/2010 | Odashima et al. ......... 206/710 |
| 2011/0049233 A1* | 3/2011 | Faith et al. .............. 235/375 |
| 2011/0174884 A1* | 7/2011 | Endres et al. ............ 235/488 |
| 2012/0052279 A1* | 3/2012 | Sung .................... 428/220 |

\* cited by examiner

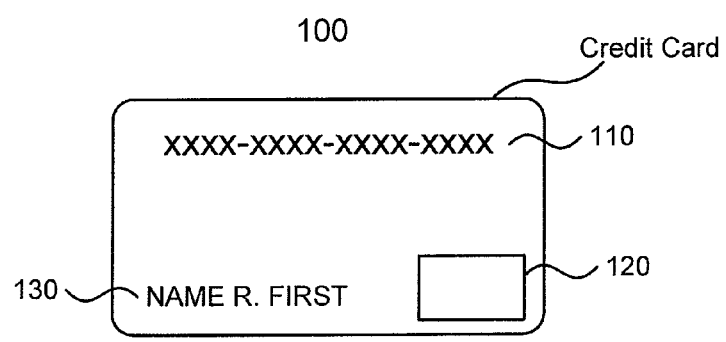
Figure 1A
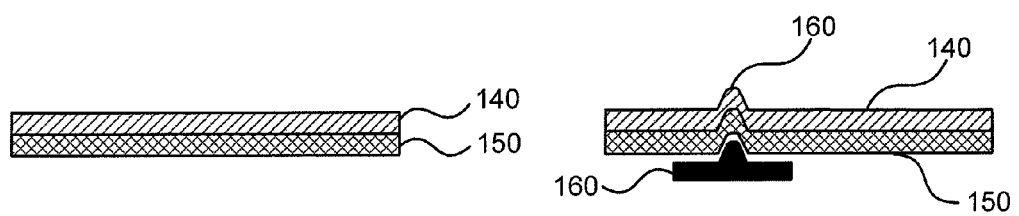
Figure 1B
Figure 1C

CRACK EMBOSSING USING DIAMOND TECHNOLOGY

CROSS-REFERENCES TO RELATED APPLICATIONS

This Application is a Non-Provisional Patent Application that claims priority to U.S. Provisional Patent Application No. 61/320,602, entitled Crack Embossing Using Diamond Technology, filed on Apr. 2, 2010, which is related to Non-Provisional patent application Ser. No. 12/414,165, entitled Authentication Using Physical Characteristics of Tokens, filed on Mar. 30, 2009, both of which are herein incorporated by reference in their entirety for all purposes.

BACKGROUND

As methods and devices for engaging in electronic authorizations have increased, problems such as fraud continue to persist. One way to reduce fraud in an electronic authorization is to authenticate the identification device, or other portable consumer device, used in the electronic authorization.

Some systems authenticate a portable consumer device using various forms of risk analysis and other information not imprinted or stored on the portable consumer device such as dynamic card verification values (dCVVs). In one exemplary conventional system, at the front end of the transaction (e.g. where a merchant and a consumer reside), the portable consumer device can provide information associated with the portable consumer device and the consumer such as an encrypted account number or other identification information. In addition, various forms of anti-counterfeiting measures have been made to the actual consumer devices. An example of a conventional credit card is depicted in FIGS. 1A, B and C.

As shown in FIG. 1A, a conventional credit card 100 typically displays information such account number 110, account holder's name 130 and some type of anti-counterfeiting measure 120. Most current credit and debit cards are made of up of at least two layers. FIG. 1B shows a cross-section of a typical credit card stock comprising a substrate layer 150 and a top layer 140. Substrate layer 150 is usually a semi-rigid plastic that can be stamped or embossed. Top layer 140 is usually a print or decal identifying the issuer of the credit card and possibly other information. In most conventional credit cards, important information such as account number 110 and account holder name 130 are embossed by an embosser 160 and then painted at the apex of the embossed regions 170 to increase legibility as shown in FIG. 1C. Embossing such information serves multiple purposes: 1) embossed information is more durable than simple printing, 2) provided a means for quickly copying such information by taking an imprint of the card and 3) embossed information is more difficult to reproduce or alter and as such was a first attempt to curb counterfeiting. In addition, credit card 100 may also have a card verification value (CVV) printed on the back of that card that is not included in any computer readable medium that might be included on the card. However, improvements to existing anti-counterfeiting technologies would be desirable.

For example, anti-counterfeiting measure 120 can be a sophisticated holographic image, a watermark, micro printed designs or text, or fluorescent details that show up under ultraviolet light. The main idea in conventional physical anti-counterfeiting technology is to include a physical characteristic on the card that is too difficult or costly to reproduce. However, counterfeiters gradually catch up to each technology in time. When the counterfeiters catch up to a particular anti-counterfeiting measure, that measure becomes obsolete. Because there is only so much that conventional anti-counterfeiting technologies can protect before they are overcome, these types of physical security measures are used in conjunction with various front end and back end encryption and computer security techniques.

Using various algorithms and encryption keys, the information provided to an authentication system is protected in an encrypted form as it is transmitted from the front end of the transaction to a back end computer system. The information sent can only be unencrypted by the back end computer system when the proper encryption key is used. Due to the critical role the encryption key plays, maintaining the secrecy of the encryption keys is of utmost importance in such systems.

In addition, some conventional authentication systems require a user to enter a PIN known only to the user to authenticate the user and the portable consumer device. This provides a level of security that helps ensure that the user presenting the portable consumer device is the authorized user of that particular device. The assumption here is that the PIN will only be known by the user and will not be revealed to or discovered by someone wishing to commit fraud.

Despite the best efforts of users and issuers of portable consumer devices, account numbers, personal identifiers, PINs and encryptions keys can be stolen or discovered and then used by unauthorized parties to replicate portable consumer devices so as to defraud authentication systems. Since data can be hacked and stolen and the sophistication of unauthorized users and counterfeiters continues to increase, it is currently possible to make fraudulent cards that can be used for in-person transactions once key information is known. The fraudulent portable consumer device will appear to be an authentic device since it will have all the correct information and characteristics. An unauthorized user may have even discovered the PIN or other access code to provide when presenting the device for authentication.

It is clear that what is needed is a system, method, and device to prevent unauthorized users from creating and using fraudulent versions of portable consumer devices. Embodiments of the disclosed invention address the above problems, and other problems, individually and collectively.

BRIEF SUMMARY

Systems, methods and apparatuses for authenticating portable consumer devices are disclosed. More specifically, embodiments of the present invention relate to creating, detecting, and authenticating portable consumer devices with unique and irreproducible physical characteristics. Portable consumer devices include a diamond-based brittle material layer that will fissure or crack in an irreproducible manner to produce complex fissure patterns that can be used to authenticate the portable consumer device. In various embodiments the brittle layer material can be a layer of diamond-based material such as diamond-like carbon (DLC) or other synthetic diamond material layers. The diamond-based material layer can be deposited on the portable consumer device in a variety of manners including, but not limited to, high-pressure high-temperature (HPHT) or chemical vapor deposition (CVD) using high and low pressure methane microwave or plasma jet reactors.

One embodiment of the present invention is directed to a portable consumer device comprising a brittle material layer disposed between a substrate layer and a protective layer. The brittle material layer comprises intentionally created fissure patterns. The fissure patterns and the portable consumer device are suitable for use in authenticating a consumer. In various embodiments, the brittle layer material can be a layer of diamond-based material. The layer of diamond-based material can be monocrystalline or polycrystalline film.

Another embodiment of the present invention is directed to a method for making a portable consumer device. The method comprises providing as substrate layer, applying a brittle material layer to the substrate layer and applying a protective layer to the surface of the brittle material layer. The method further comprises creating a unique fissure pattern using a process, wherein the process can be standardized and wherein the result of using the process to create a plurality of portable consumer devices is unique fissure patterns in the brittle material layer each of the plurality of portable consumer devices. In various embodiments, the brittle layer material can be a layer of diamond-based material. In other embodiments, the separate protective layer can be omitted. In such embodiments, the diamond-based brittle material layer can be used and the protective layer due to diamond's natural hardness and durability.

Another embodiment of the present invention is directed to a method of using a portable consumer device comprising a substrate layer, a protective layer and a diamond-based brittle material layer with a unique fissure pattern associated with the portable consumer device disposed between the substrate layer and the protective layer. The method comprises presenting the portable consumer device to an authentication requestor. The method further comprises sending fissure data regarding the unique fissure pattern associated with the portable consumer device to a server. The fissure data regarding the unique fissure pattern associated with the portable consumer device is received by the server, wherein a comparison with stored fissure data regarding the unique fissure pattern associated with the portable consumer device is performed, and an authorization response message is sent based on the comparison. The method further comprises receiving an authorization response message. In other embodiments, the protective layer can be omitted.

Another embodiment of the present invention is directed to a method of authenticating a portable consumer device comprising a substrate layer, a protective layer and a diamond-based material layer with a unique fissure pattern associated with the portable consumer device disposed between the substrate layer and the protective layer. The method comprises receiving data regarding the unique fissure pattern associated with the portable consumer device. The method further comprises comparing the data regarding the unique fissure pattern associated with the portable consumer device received with data regarding the unique fissure pattern associated with the portable consumer device stored in a database. Then, based on a comparison of the data regarding the unique fissure pattern associated with the portable consumer device received and data regarding the unique fissure pattern associated with the portable consumer device stored in the data store, sending an authorization response message.

BRIEF DESCRIPTION OF THE DRAWINGS

FIGS. 1A, B, and C depict payment cards that can be improved by embodiments of the present invention. FIG. 1A shows a front view, while FIGS. 1B and 1C show side, cross-sectional views.

DETAILED DESCRIPTION

Figure 2A:
FIGS. 2A, B, and C depict side, cross-sectional views of portable consumer devices according embodiments of the present invention.

FIG. 2A depicts the cross-section of a portable consumer device according to one embodiment of the present invention. Portable consumer device 200A includes two layers. In various embodiments, layer 210 is a substrate layer and can be made up of any suitable material including, but not limited to, plastic, resin, metal, or some combination or composite thereof. For many embodiments, it is desirable to choose a material for substrate 210 that balances the rigidity of the material with the ability of the material to be stamped or embossed, such as when credit, debit, or gift cards are embossed with account numbers, names, and other information. Such embossed features can be achieved by custom or standardized stamps, presses, impact printers, and molds or otherwise. In various embodiments, it is desirable for the substrate to not puncture or perforate when stamped or embossed.

In some embodiments, layer 220, in contrast to layer 210, is a brittle diamond-based material that can break, crack, crease or otherwise become discontinuous when subjected to impact, shearing, compression, stress, or strain. In various other embodiments, diamond-based brittle material layer 220 is stable enough that once it is intentionally broken or cracked to create a unique fissure pattern during the manufacturing or issuing process, further cracking and breakage stops or is minimal. In some embodiments, diamond-based brittle material layer 220 can be heat treated, irradiated, chemically set or otherwise annealed or softened to prevent further breakage after the initial intentional cracking. In some embodiments, diamond-based brittle material layer 220 is resistant to surface scratches and abrasions. The diamond-based material can include various forms of synthetic diamond created and applied to the substrate layer 210 in a variety of manners and processes.

In various embodiments diamond-based brittle material layer can be doped or augmented to be opaque to specific bands of the electromagnetic spectrum. For example, in one embodiment, diamond-based brittle material layer 220 is opaque to ultra violet light. In yet another embodiment, diamond-based brittle material layer 220 is opaque to infrared light. When diamond-based brittle material layer 220 is opaque, the fissure pattern can be detected or imaged by back illuminating the portable consumer device 200A and imaging or otherwise detecting the resulting illuminated fissure pattern. In various embodiments of the present invention, substrate layer 210 is at least partially translucent to whatever band or frequency of the electromagnetic spectrum to which brittle material layer 220 is opaque.

Figure 2B:
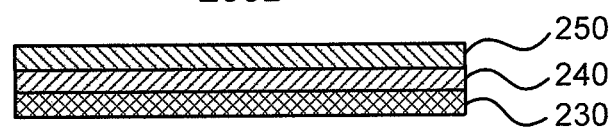

FIG. 2B depicts portable consumer device 200B according to various embodiments of the present invention. Portable consumer device 200B is similar to the portable consumer device 200A in FIG. 2A, except portable consumer device 200B includes three layers; 230, 240 and 250. In various embodiments, layer 230 is a substrate layer similar to layer 210 described above and can be made of material including, but not limited to, plastic, metal, resin, or an appropriate polymer that can be formulated to have the desired balance of rigidity and malleability. In various embodiments, the balance of rigidity and malleability is achieved when layer 230 can withstand stamping, embossing or bending without breaking, splitting or perforating. Layer 240 is a diamond-based brittle material that can be doped with materials that include, but are not limited to, glass, ceramic, doped silicon, impurities, pigments or other diamond-based materials.

In various embodiments, diamond-based brittle material layer 240 can be annealed or softened to prevent breakage once a fissure pattern is produced in the portable consumer device 200B. The diamond-based brittle material layer 240 can be made hard enough or soft enough so that after the unintentional cracking it resists or prevents further cracking. In various embodiments, fissures patterns are produced in brittle material layer 240. Diamond-based brittle material layer 240 can then be annealed or softened before protective layer 250 can be applied to portable consumer device 200B. In other embodiments, protective layer 250 can be applied to portable consumer device 200B and then diamond-based material brittle material layer 240 is annealed. In yet other embodiments, layers 230, 240 and 250 are joined together and then the fissure pattern is created in portable consumer device 200B. Once the fissure pattern is created in the portable consumer device 200B, the entire portable consumer device 200B is treated such that substrate layer becomes more rigid to protect brittle material layer 240, brittle material layer 240 is annealed, and protective layer 250 is fused to brittle material layer 240 and hardened to prevent further breaking or movement of brittle material layer 240. In some embodiments, the protective layer can be omitted if the brittle material, such as a diamond or diamond-based material, is hard enough to resist scratches and wear.

In various embodiments, protective layer 250 can conceal at least some of the area of the brittle material layer 240 from view. In various other embodiments, protective layer 250 can be at least partially translucent (e.g. transparent). In yet other embodiments, protective layer 250 is translucent in some regions of the portable consumer device 200B and opaque over other regions of the portable consumer device 200B. In such embodiments, it is possible to see the portions of the fissure patterns in the regions where protective layer 250 is translucent, whereas the portions of the fissure pattern under concealed regions of the protective layer 250 are hidden from view. In some embodiments, protective layer 250 can be opaque to visible light but translucent or transparent to other bands or frequencies of the electromagnetic spectrum outside of the human visible spectrum.

Figure 2C:
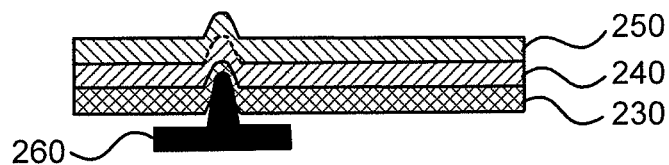

FIG. 2C depicts one method of creating a fissure pattern in the brittle material layer 240 according to various embodiments of the present invention. In various embodiments, protective layer 250, diamond-based brittle material layer 240 and substrate layer 230 are stacked as shown in portable consumer device 200C. In some embodiments, the process starts with forming and cutting a precursor for the substrate layer 230 into the desired size, shape, and thickness. In some embodiments, the substrate layer 230 has the same lateral dimensions as a credit or debit card. In various embodiments, the substrate layer 230 is approximately 0.5 mm to 2 mm thick. In such embodiments, the overall thickness of the portable consumer device, including the substrate layer 230, the diamond-based material brittle material layer 240 and the protective layer 250 should be in the range between 0.6 mm to 2.5 mm.

In various embodiments, diamond-based brittle material layer 240 is applied to the substrate layer 230. Application of the diamond-based brittle material layer 240 to substrate layer 230 can be achieved in numerous ways. In one embodiment, brittle material layer 240 is a sheet of material that can be adhered to the surface of substrate layer 230 (e.g. in a lamination processes). In various embodiments, brittle material layer 240 is applied as a paint, liquid, gel or slurry. In such embodiments, the brittle material layer can be brushed, rolled or sprayed onto the surface of substrate layer 230. In various embodiments, the paint, liquid, gel or slurry for the brittle material is dried, treated or otherwise hardened before proceeding to the next step. In various embodiments, the drying of brittle material layer 240 causes fissure patterns in brittle material layer 240. For example, a paint or a slurry of a solvent and a pigment can be formulated to result in an unpredictable cracked pattern similar to that observed in quickly dried mud or paint or crazed glass. Those skilled in the art will recognize that there are various methods that can be used to create unpredictable and random fissure patterns in the brittle material layer without departing from the spirit or scope of the present invention. Additionally, the brittle material layer 240 can include multiple layers of brittle materials. For example, the brittle material layer can include a layer of a diamond-based brittle material and a layer of a painted on material that later dries. By including two or more brittle material layers, the resulting random fissure or cracked pattern can comprise an over of random fissure or cracked patterns from each layer, thus increasing the complexity of the random fissure or cracked pattern thereby decreasing the likelihood that the pattern could be readily forged or counterfeited.

In various embodiments, protective layer 250 is applied to the exposed surface of diamond-based brittle material layer 240. In some embodiments, protective layer 250 is a film and is applied in sheet form. In various other embodiments, protective layer 250 is applied as paint, liquid, gel, or slurry. In various embodiments, at least a portion of the protective layer 250 is opaque to visible light. In other embodiments, protective layer 250 is transparent to visible light over all or some of the area of the portable consumer device 200C. In this way, the surface of brittle material layer 240 can be selectively exposed. In various embodiments it is desirable to obscure some or all of the fissure pattern to further thwart potential fraud or counterfeiting.

In some embodiments the brittle material layer 240 or protective layer 250 can include a diamond-based material. The diamond-based material can be a synthetic diamond-based material produced in any manner suitable for producing polycrystalline or monocrystalline. The diamond-based material layer can be deposited on the portable consumer device or the substrate layer device in a variety of manners including, but not limited to, high-pressure high-temperature (HPHT) or chemical vapor deposition (CVD) using high and low pressure methane microwave or plasma jet reactors.

Chemical vapor deposition, or CVD, of diamond is a method of producing synthetic diamond by creating the circumstances necessary for carbon atoms in a gas to settle on a substrate in crystalline form. Chemical vapor deposition of diamond has received a great deal of attention in the materials sciences because it allows many new applications of diamond that had previously been considered too difficult to make economically. The use of CVD diamonds are thus capable of being economically used in fissure or crack pattern identification methods described herein.

CVD diamond growth typically occurs under lower pressure and involves feeding varying amounts of gases into a chamber, energizing them and providing conditions for diamond growth on a substrate. The gases can include a carbon source, and typically include hydrogen, though the amounts used vary greatly depending on the type of diamond being grown. Energy sources can include hot filament, microwave power and arc discharges, and others. The energy source can be specifically configured and energized to generate plasma in which the gases are broken down to produce chemistries that are more complex for the purpose of diamond material creation.

The advantages to CVD diamond growth include the ability to grow diamond over large areas, the ability to grow diamond on a substrate, and the control over the properties of the diamond produced. In the past, when high-pressure high-temperature (HPHT) techniques are used to produce diamond, the diamonds are typically very small free standing diamonds of varying sizes. With CVD diamond, relatively large grow areas are possible, thus making it possible to coat larger areas with monocrystalline or polycrystalline layers of diamond-based materials as described for diamond-based brittle material layer 240 according to various embodiments of the present invention.

The ability to grow diamond-based material directly on a substrate is important because it allows for the addition of many of diamond's specific material properties and qualities to other materials such as the substrate layers 210 and 230. Since diamond has the highest thermal conductivity of any material. Accordingly, layering diamond-based materials onto certain substrates allows the diamond to be used as a heat sink. In such embodiments, the unique thermal properties of the portable consumer device having a diamond material layer, like a credit card, can be imaged for identification purposes. In such embodiments, the portable consumer device can be exposed to a heat source and the resulting heat dissipation pattern can be tracked and used to recognize not only the specific fissure or cracked pattern in the diamond-based brittle material layer or layers, but also the specific thermal dissipation or thermal conductivity of a particular form or formulation of the diamond-based brittle material layer or layers.

For example, a portable consumer device with a diamond-based brittle material layer that has an intentionally created random fissure or cracked pattern in the diamond-based brittle material can be exposed to a heat source. The exposure to the heat source can be localized or concentrated on one or more parts of the portable consumer device, evenly distributed or varied over time. The instantaneous or prolonged heat dissipation or conductivity can then be tracked or measured using thermal imaging or other heat measurement techniques, such as contact and contactless thermometers. The heat, or thermal energy, will tend to propagate more readily along continuous parts of the diamond-based brittle material layer. Accordingly, less heat or thermal energy will propagate across fissures or cracks than along continuous pieces diamond-based brittle material layer, and thus create a distinctive heat dissipation or conductivity signature specific to the intentionally created random cracked or fissure pattern in the diamond-based brittle material layer. The thermal dissipation or conductivity signature can then be included as all or part of the signature of the intentionally created random fissure or cracked pattern in the diamond-based brittle material layer. The addition of the thermal dissipation or conductivity signature adds yet another layer of complexity and security to stop or deter fraudulent portable consumer devices from being created in various embodiments of the present invention.

As described above, in some embodiments the diamond-based brittle material layer 240 can be opaque to various forms of radiation. For example, the brittle material layer can be opaque to bands of the electromagnetic spectrum in or out of the human visible range. In such embodiments, it is beneficial for the substrate layer 230, the protective layer 250 or both to be more transparent to the particular form of radiation to which the brittle material layer 240 is at least partially opaque.

In various embodiments, diamond-based brittle material layer 240 can polarize or reject based on polarization at least a portion of the radiation incident on portable consumer device 200B. In various embodiments, it is possible to detect the fissure patterns in diamond-based brittle material layer 240 by illuminating the portable consumer device with a particular form of radiation and detecting the shadows, interference patterns, diffraction patterns, polarization effects or refraction patterns of the fissure pattern in brittle material layer 240. For example, the brittle material layer 240 can be opaque to x-rays while the protective layer 250 and the substrate layer 230 are transparent to x-rays. In this way, an x-ray image of the fissure or cracked pattern can be produced with an x-ray emitter and an x-ray detector. Such a process is described in more detail in reference to FIG. 6.

In various embodiments of the present invention, the fissure pattern is created by a stamp or embosser 260. In various embodiments, the embosser is the same one used to emboss information into the portable consumer device 200C. In various embodiments, when stamp 260 strikes or presses into the substrate layer, it pushes up and deforms substrate layer 230, which in turns cracks or breaks brittle material layer 240 and presses the cracked portion of brittle material layer 240 up and into protective layer 250. The result is an embossed figure, letter, number or symbol. In some embodiments, the fissure patterns 270 are detected or imaged on and around the regions 280 that are embossed.

Figure 3:
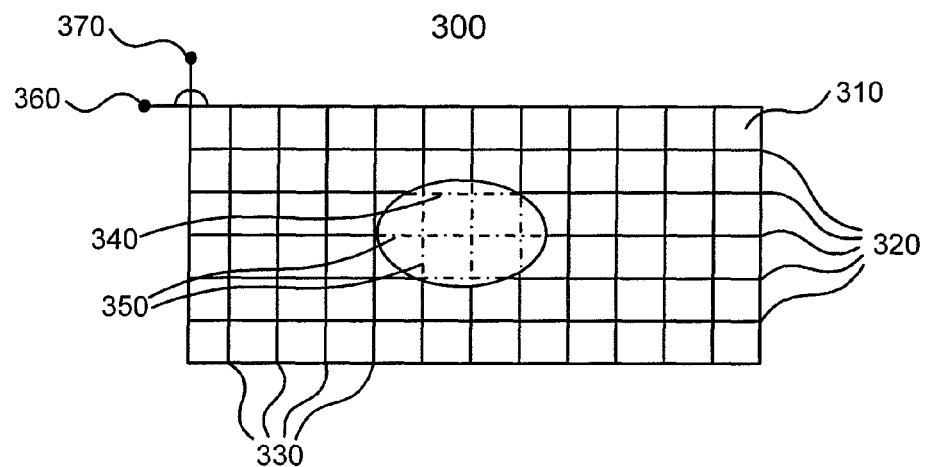
FIG. 3 shows a top view of a layer of conductors according to an embodiment of the present invention.

FIG. 3 is an overview of a sample region 300 of diamond-based brittle material layer 240 according to yet another embodiment of the present invention. Sample region 300 is lined with conductors 320 and 330 in a grid pattern. In other embodiments, conductors 320 and 330 can be in some other multi-celled configuration such as a hexagonal grid or triangular grid. In some embodiments, conductors 320 and 330 are electrically coupled. In other embodiments, conductors 320 and 330 are electrically isolated from each other. In various embodiments, the conductors are sandwiched between a substrate layer and protective layer. In various embodiments, conductors 320 and 330 can be semiconductors such as doped silicon. In yet other embodiments, the diamond-based brittle material layer can be uniformly or variably doped with a conductor or conductive impurity to for a monocrystalline or polycrystalline conductive network within the diamond-based material layer. Various contaminants and impurities can be added to the diamond-based brittle material layer to locally or globally change the physical, chemical, mechanical, optical, sonic, electrical or other properties of the diamond-based brittle material layer to further increase the complexity and unique nature of the diamond-based brittle material layer and/or the intentionally created random fissure or cracked pattern therein.

In various other embodiments, the conductors in one direction, such as conductors 320 are couple to a bus 390 that has a lead 370 so that an electrical signal can be applied to conductors 320. Similarly, in various embodiments, conductors 330 are coupled to bus 380 that has a lead 360 so that an electrical signal can be applied to conductors 330. In those embodiments in which conductors 320 are electrically isolated from conductors 330, a separate signal can be applied to lead 360 and lead 370. In some embodiments, the signal applied to lead 320 is different from the signal applied to lead 330.

The electrical interaction between a conductors 320 and a diamond-based brittle material layer with intentionally create unique and random cracked patterns can be used to generate a unique electromagnetic signature based on the electrical or magnetic relationships between the diamond-based and the conductors. In such embodiments, the conductors can be included in the diamond-based brittle material layer or be included in the substrate layer. The conductors 320, in addition to being configured in a grid, can also be configured as a continuous sheet. The electrical relationships and the resulting electromagnetic signature can be based on the measured electrical current, resistive, inductive, capacitive, magnetic field or other electrical property that results with an electrical signal is applied or induced in portable consumers devices that include a conductor and a diamond-based brittle material layer.

Some or all of such properties of a portable consumer device that can be measured or imaged according various embodiments described herein can be influenced or determined by internal crystal zone boundaries within the diamond-based brittle material layer. The crystal zone boundary lines can determine various physical, electrical, and optical properties that can be used to characterize, measure or otherwise detect and identify the intentionally created random fissure or cracked patterns in the diamond-based brittle material layer. In other embodiments, the crystal zone boundaries can be used as the unique and random pattern in the diamond-based brittle material layer. In such embodiments, the diamond-based brittle material may or may not be intentionally cracked. The random crystal zone boundaries can be created intentionally using various techniques known in the art to prevent the growth of monocrystalline layer of diamond-based material.

In various embodiments, lines 350 are cracked or broken when feature 340 is embossed into sample region 300. The dimple in FIG. 3 is just an example of one type of feature 340 that can be embossed into portable consumer device 300. In various other embodiments, sample region 300 can be embossed with any information desired such as account numbers, identification information or names. Each embossed feature can create a unique fissure or breakage pattern in conductors 320 and 330 at points 350. The fissure or breakage patterns at points 350 in embossed feature 340 can be detected by appropriate means.

In various embodiments, the fissure, breakage or cracked patterns at points 350 in feature 340 can be imaged using conventional visible light imaging. In various other embodiments, fissure or breakage patterns at points 350 in feature 340 can be detected using conventional non-visible radiation imaging. For example, x-ray, ultraviolet, infrared, or sound (sonic) imaging can be used to detect and record fissure or breakage patterns at points 350 in feature 340. One skilled in the art will recognize that other methods of detecting fissure or breakage patterns at points 350 in feature 340 are possible without deviating from the spirit or scope of the present invention.

In various other embodiments, a signature of the electromagnetic field (EMF) can be detected to recognize the fissure or breakage patterns at points 350 in feature 340. By applying an electrical signal to leads 360, 370 or both, the array of conductors 320 and 330 will have a distinctive EMF signature that can be detected. In various other embodiments, conductors 320 and 330 are electrically coupled and the sample region can be inserted into a calibrated alternating or varied magnetic field to induce a current in each of the remaining closed loops. In such an embodiment, the current or the induced opposing magnetic field can be measured to detect the signature of the portable consumer device.

Figure 4:
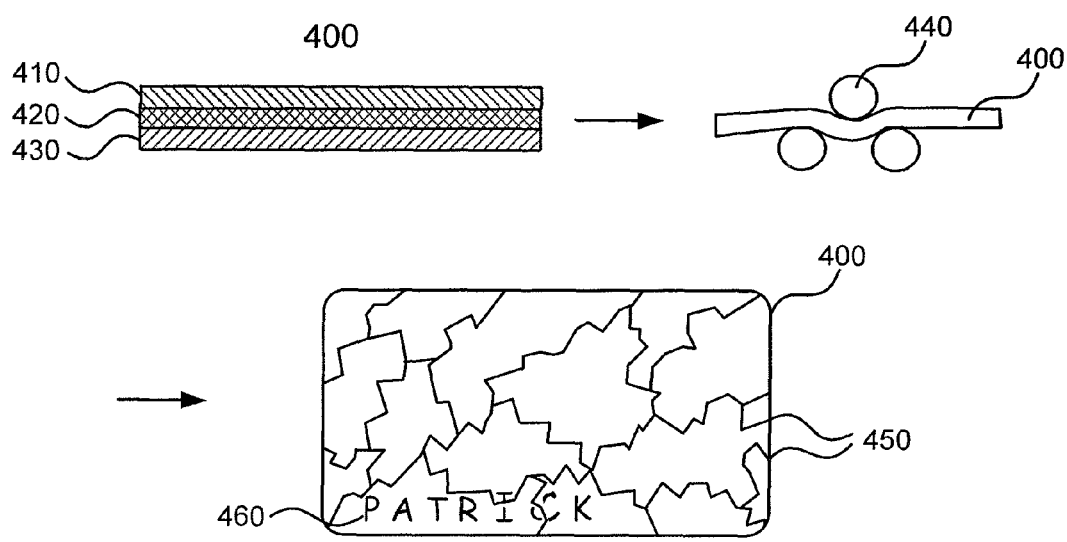
FIG. 4 depicts the process and result of creating fissure patterns in a portable consumer device according to an embodiment of the present invention.

FIG. 4 is an illustration of a method to create fissure or cracked patterns in diamond-based brittle material layer 420 of portable consumer device 400 according to one embodiment of the present invention. In various embodiments, portable consumer device 400 includes a substrate layer 430, a diamond-based brittle material layer 420 and a protective layer 410. For some formulation of diamond-based brittle materials, the protective layer 410 can be omitted. Portable consumer device 400 is passed through a set of rollers 440 configured to deform portable consumer device 400 to the point where diamond-based brittle material layer 420 develops fissures or cracks 450. As depicted in FIG. 4, rollers 440 with offset radii are arranged so that portable consumer device 400 is deformed in a serpentine fashion as it is passed through the rollers to create fissures and cracks in diamond-based brittle material layer 420. In other embodiments, fissure and cracks can be created by physical, thermal, or sonic shock, impact, stress, strain, or sheer to the surface of portable consumer device 400. Any force that can be applied to a portable consumer device can be used to create the unique and random cracked pattern in the diamond-based brittle material layer can be used.

In some embodiments, portable consumer device 400 is struck with a blunt or sharp hammer one or more times to create fissure patterns in the brittle material layer 420. In various other embodiments, the location, direction, amount of force of the blow, and hardness and shape of the hammer is varied from portable consumer device to portable consumer device to further increase the variety and style of fissure patterns created in the brittle material layer 420 of each portable consumer device manufactured.

In various embodiments, the same standardized process to create fissure patterns in the brittle material layer can be used to create a plurality of portable consumer devices each with a unique fissure pattern different from the fissure pattern in any other portable consumer device produced by the standardized process. In such embodiments, the process can include a single device, or many identical devices, that subject a plurality of portable consumer devices to the same stress, strain or shock and because of the material properties of the brittle material, a fissure pattern unique to each portable consumer device will be created.

The standardized process can comprise, but is not limited to, a set of rollers to deform the portable consumer device, a set of hammers or stamps with which to strike the portable consumer devices, a spring loaded sudden stop or other means for applying a physical shock to the portable consumer devices. In various other embodiments, the standardized process can comprise a predetermined thermal shock or sonic shock. Ideally, the nature of the material used for brittle material layer will crack, shatter or craze in unpredictable ways so that each portable consumer device produced will have a unique and irreproducible fissure pattern. One example of the desired type of fissure pattern is the unpredictable cracked, shattered, or crazed patterns seen in broken or shattered sheets of glass, porcelain or ceramic. Thus, embodiments of the invention can economically use the same process to create portable consumer devices including different fissure patterns that can be used to authenticate them when they are used to conduct transactions.

In some embodiments, the diamond-based material used has non-crystalline or anisotropic internal structure. In other embodiments, the material used in diamond-based brittle material layer 420 has crystalline or isotropic internal structure. A person of ordinary skill in the art will recognize that many types of diamond-based materials can be used to make diamond-based brittle material layer 420 without departing from the spirit or scope of the present invention.

In various embodiments, information can be printed on diamond-based brittle material layer 420 before cracks and fissures 450 are created. For example, account numbers, names and other identification information 460 can be printed on the surface of diamond-based brittle material layer 420 before it is coated with protective layer 410. In such embodiments, figures and text printed on brittle material layer will break in unique ways as shown in FIG. 4 at name 460. As shown, the name "PATRICK" is broken along the "I" and the "C" at locations where the letters intersect cracks or fissures. Information regarding the location and manner in which text or figures are broken can be used, in addition to or as part of the fissure pattern data, to authenticate the portable consumer device 400.

In various embodiments, rollers 440 include three rollers where one roller is opposite the two other rollers such that portable consumer 400 device deforms in at least one direction. In various other embodiments, more than three rollers can be configured to deform portable consumer device 400 in two directions and potentially more than once by running portable consumer device 400 through rollers 440 more than once or in more than one direction. For example, portable consumer device 400 can be run through roller 440 in one direction such as along the long axis of the portable consumer device 400 and then be run through the rollers in the reverse direction. Optionally, portable consumer device 400 can then be reoriented by rotating portable consumer device 400 90° around an axis perpendicular to the surface of the portable consumer device 400 and passed through rollers 440 again. One skilled in the art will recognize that the use of rollers to deform portable consumer device 400 can include many variations of orientations, number of rollers and number of passes without deviating from the spirit or scope of the present invention.

In various embodiments, fissure patterns are created at the point of sale or issuance of each portable consumer device. Such embodiments are particularly useful to prevent fraud in consumer prepaid payment or gift cards. For example, a portable consumer device can be a prepaid gift card. In such embodiments, the fissure patterns can be produced in the brittle material layer in a compact cracking device at the point of sale. For example, the gift card can be deformed to create the fissures in a cracking device located near a cash register or in a kiosk. In various embodiments of the present invention, the compact cracking device includes rollers. In various other embodiments, the compact cracking device includes a hammer surface against which or with which to strike or shock the gift card to produce fissure patterns in the diamond-based brittle material layer 420. In various other embodiments, the compact cracking device includes a fissure pattern detection system that can detect and record the unique fissure pattern data of each individual portable consumer device for use later in authenticating that particular portable consumer device when a user tries to redeem it. A fissure pattern detection system is described in more detail below in reference to FIG. 6.

Figure 5A:
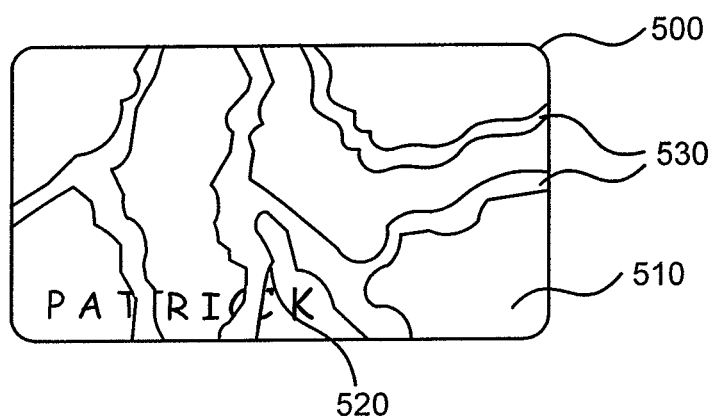
FIG. 5A depicts a fissure pattern on a portable consumer device according to an embodiment of the present invention.
Figure 5B:
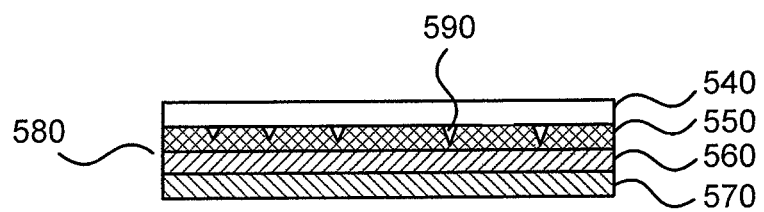
FIG. 5B depicts the cross-sectional view of a fissure pattern in a portable consumer device according to an embodiment of the present invention.

FIG. 5A is an illustration of a portable consumer device that uses a slurry comprising one or more solvents and one or more pigments to produce the fissure pattern in portable consumer device 500 according to one embodiment of the present invention. Portable consumer device 500 includes four layers; substrate layer 570, barrier layer 560, brittle material layer 550 and protective layer 540. In other embodiments, portable consumer device 500 can include more or fewer layers. The scale of the layers relative to one another in FIG. 5, or in any of the other figures discussed herein, should not be considered limiting in any way. One skilled in the art will recognize that various thicknesses of each layer can be used without deviating from the spirit and scope of the present invention.

In one embodiment of the present invention, substrate layer 570 and barrier layer 560 are adhered or otherwise attached to one another. In various embodiments, barrier layer 560 and substrate layer 570 can be the same layer of portable consumer device 500. In some embodiments, barrier layer 560 prevents solvents from penetrating or being absorbed by substrate layer 570. In various embodiments of the present invention, brittle material layer 550 is applied to all or some of the surface of barrier layer 560 in the form of a slurry. In various embodiments, the slurry can be used as a paint to print text, a pattern or a picture such a company name or a logo. In various other embodiments, the slurry is applied to the entire surface of barrier layer 560. The slurry can include an admixture of one or more solvents and one or more pigments. In some embodiments, the evaporation rate or concentration of each solvent used in the slurry can be different so that one solvent evaporates before the others.

In various embodiments, as the slurry dries, the top of the brittle material layer 550, because it is exposed, dries at a faster rate than the bottom of brittle material layer 550. As the solvents evaporate, the slurry dries. As the slurry dries it contracts. Because of the different rates of drying based on depth of the slurry and the types of solvents used, fissures 530 will form at the top of the slurry because the top will contract at a rate faster than the slurry closer to the barrier layer 560. In various embodiments, once the slurry is entirely dry and brittle material layer 550 includes sufficient fissure patterns 530 for use in authenticating the portable consumer device 500, brittle material layer can be treated so that more fissures do not develop after the time of manufacture.

In various embodiments, treating brittle material layer 550 can include applying plasticizers to the brittle material layer 550 to make it supple or flexible. In various other embodiments, treating brittle material layer 550 can include heating, irradiating or cooling the portable consumer device 500 to make brittle material layer softer. In various other embodiments, protective layer 540 is applied to and fused to brittle material layer to immobilize and stabilize the fissure pattern 530.

In various embodiments, brittle material layer 550 is one color and using another color, text or other figures can be printed on the surface of brittle material layer 550 while the top of the slurry is still wet. In such embodiments, the printed text or figures will crack where the top surface of the brittle material layer 550 cracks making unique cuts and breaks into the printed text or figures that can also be used for later authentication when a user presents the portable consumer device 500 to an authentication requestor.

In yet other embodiments, fissure patterns 450 and 590 can be observed or detected at the edge 580 of portable table consumer device 500. In such embodiments, the edge 580 of portable consumer device 500 is presented to a sensor. Details of such a method and apparatus are discussed below in reference to FIG. 7.

Figure 6:
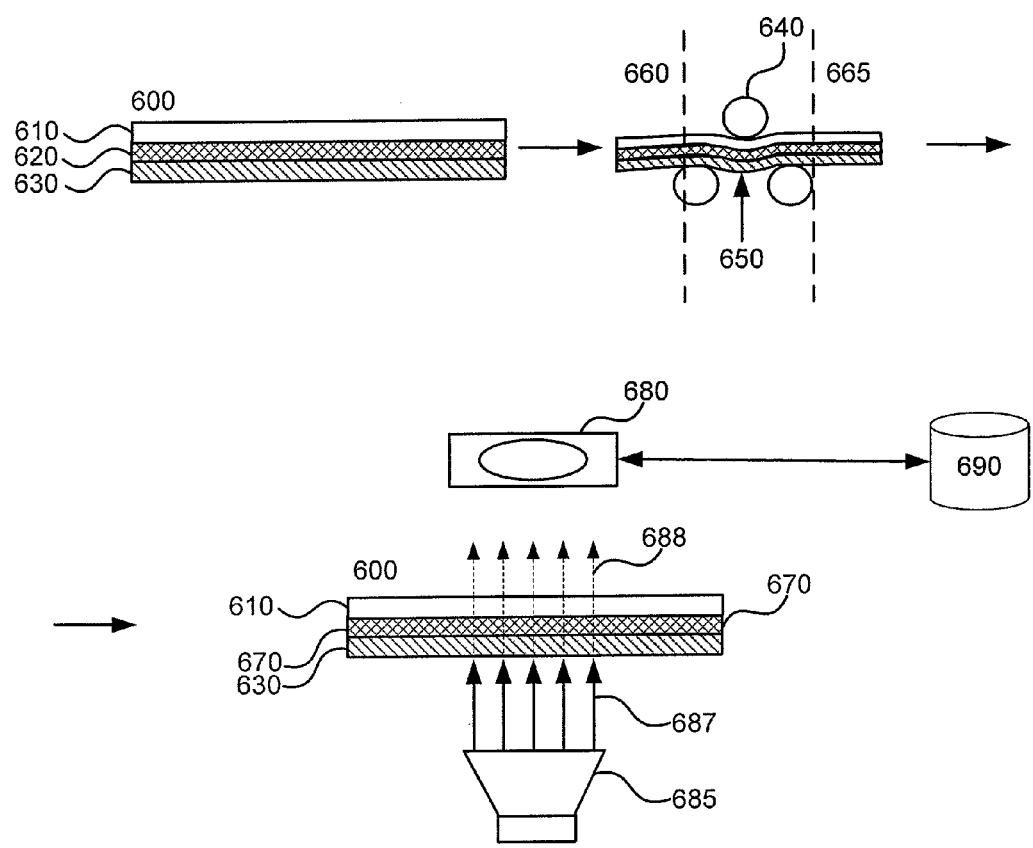
FIG. 6 depicts a system which can be used to perform a method for creating and detecting fissure patterns in a portable consumer device according an embodiment of the present invention.

FIG. 6 is a fissure pattern producing and detection system according to one embodiment of the present invention. A portable consumer device 600 with at least a substrate layer 630, a diamond-based brittle material layer 620 and protective layer 610 passes through a set of rollers 640 thus deforming portable consumer device at point 650. The deformation of portable consumer device 600 at point 650 is severe enough such that the fissure pattern in diamond-based brittle material layer 620 in region 665 after the rollers is significantly different from fissure patterns that might have been present in the diamond-based brittle material layer 620 in the region 660 before the rollers. Once portable consumer device 600 is processed to have a unique fissure pattern, data regarding the unique fissure patterns is detected and recorded by sensor 680. In various embodiments, source 685 directs radiation 687 at the substrate layer 630 side of portable consumer device 600 to back-expose it. Depending on whether the brittle material layer 670 is completely opaque or partially translucent to radiation 687, radiation 687 is either completely blocked or attenuated in the regions where the brittle material layer is intact. In regions where brittle material layer 670 is cracked, radiation 687 passes through portable consumer device 600 and emerges on the other side as attenuated radiation 688.

Radiation 687 can be a form of radiation including, but not limited to, visible light, infrared light, ultraviolet light, polarized radiation, x-rays, sonic waves or sonic pulses. Attenuated radiation 688 can then be imaged or detected by sensor 680. In various embodiments, sensor 680 includes appropriate filters, receivers, polarizers or lenses to better detect attenuated radiation 688. In various embodiments, attenuated radiation 688 can be detected as a transmittance profile. In other embodiments, the attenuated radiation 688 can be measured as an integrated total transmittance value using an optical integrating device such as an integrating sphere.

In various embodiments, the fissure pattern in portable consumer device 600 is detected or imaged all at once in a single exposure like a photograph. In such embodiments, sensor 680 can be an imaging device such as a digital camera. In other embodiments, portable consumer device 600 is moved relative to sensor 680 and source 685 to scan the fissure pattern. In such embodiments, sensor 680 can be a scan-head in close proximity to surface of portable consumer device 600.

Diamond-based brittle material layer 620 includes material that can be excited by incident radiation so as to reemit radiation. For example, brittle material layer can contain phosphors or fluorescent materials that are temporarily excited into higher energy states by electrons or ultraviolet light so that they appear to glow in all regions except where the brittle material is cracked. The resulting image of the fissure pattern looks like a dark pattern of cracks on a bright background. In such embodiments, source 685 can be mounted so that radiation 687 is incident on the portable consumer device 600 from the same side on which sensor 680 is located.

The image of fissure or other fissure data detected regarding the fissure pattern in the brittle material layer 670 can be stored in memory 690 (which may be a database). In various embodiments, fissure data can comprise data and information regarding the unique fissure pattern in the brittle material layer 670 including, but not limited to, an image of at least a portion of the fissure pattern, an EMF signature of the fissure pattern, or a transmittance profile of at least a region of the portable consumer device. Memory 690 can be local relative to sensor 680 and source 685 or it can be located at a remote location connected via a network. In yet other embodiments, the system in FIG. 6 does not include the capability to deform portable consumer device 600 such as rollers 640. In such embodiments, the system in FIG. 6 is a fissure pattern detection system that can be used to image or detect the fissure patterns in the brittle material layer 670 when a consumer presents the portable consumer device 600 to an authentication requestor for authentication. For example, a fissure pattern detection system can be included in an access device like a point-of-sale terminal.

Figure 7:
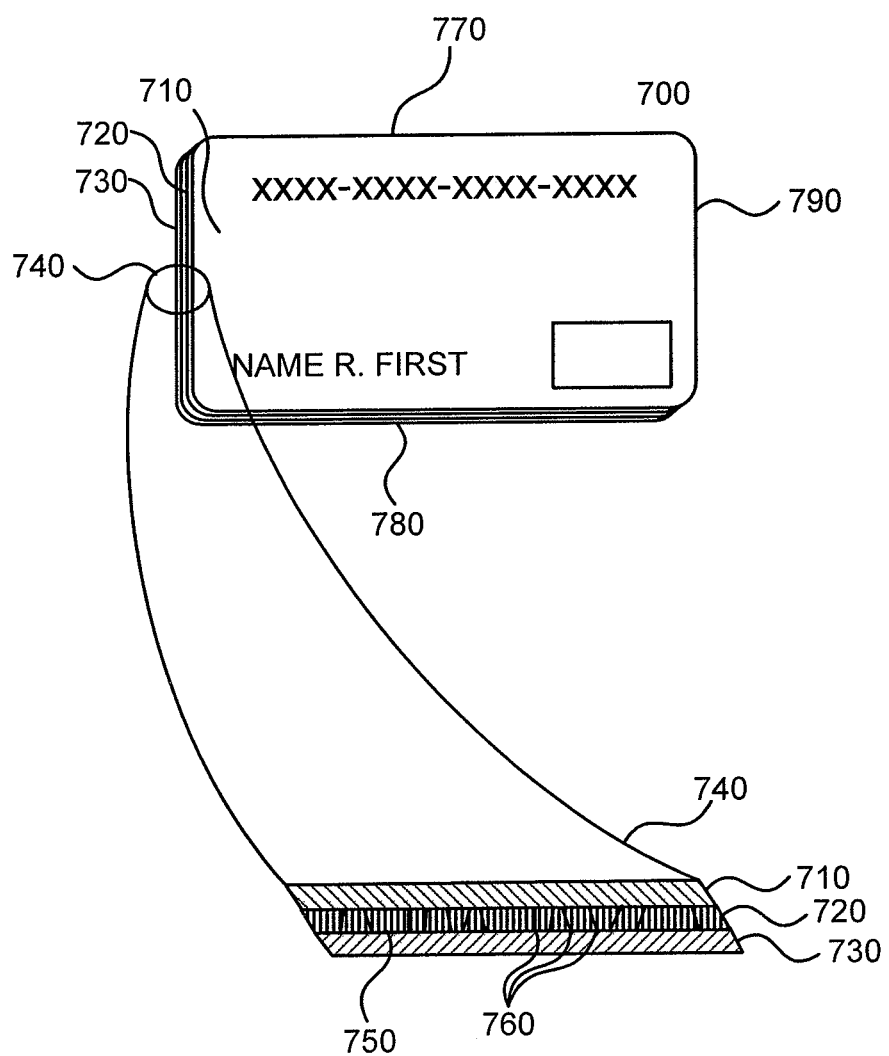
FIG. 7 depicts the side view of edge features of a fissure pattern in a portable consumer device according to an embodiment of the present invention.

FIG. 7 depicts a portable consumer device in the form of a card 700 with detectable edge characteristics due to the fissure pattern in the brittle material layer 720. Card 700 has a diamond-based brittle material layer 720 with a unique fissure pattern sandwiched between a protective layer 710 and substrate layer 730. A blow-up of edge 740 is shown. Regions of the diamond-based brittle material layer 720 edge that have no cracks appear to be solid regions 750 of brittle material layer 720. The fissure pattern appears at edges 740, 770, 780 and 790 as cracks or voids 760 in the diamond-based brittle material layer 720. In various embodiments, the pattern of voids 760 to solid regions 750 can be a distinguishable as the fissure pattern on which they are based. In various embodiments, the voids 760 and solid regions 750 pattern of at least one edge of card 700 is scanned each time the card is presented by a user.

Figure 8:
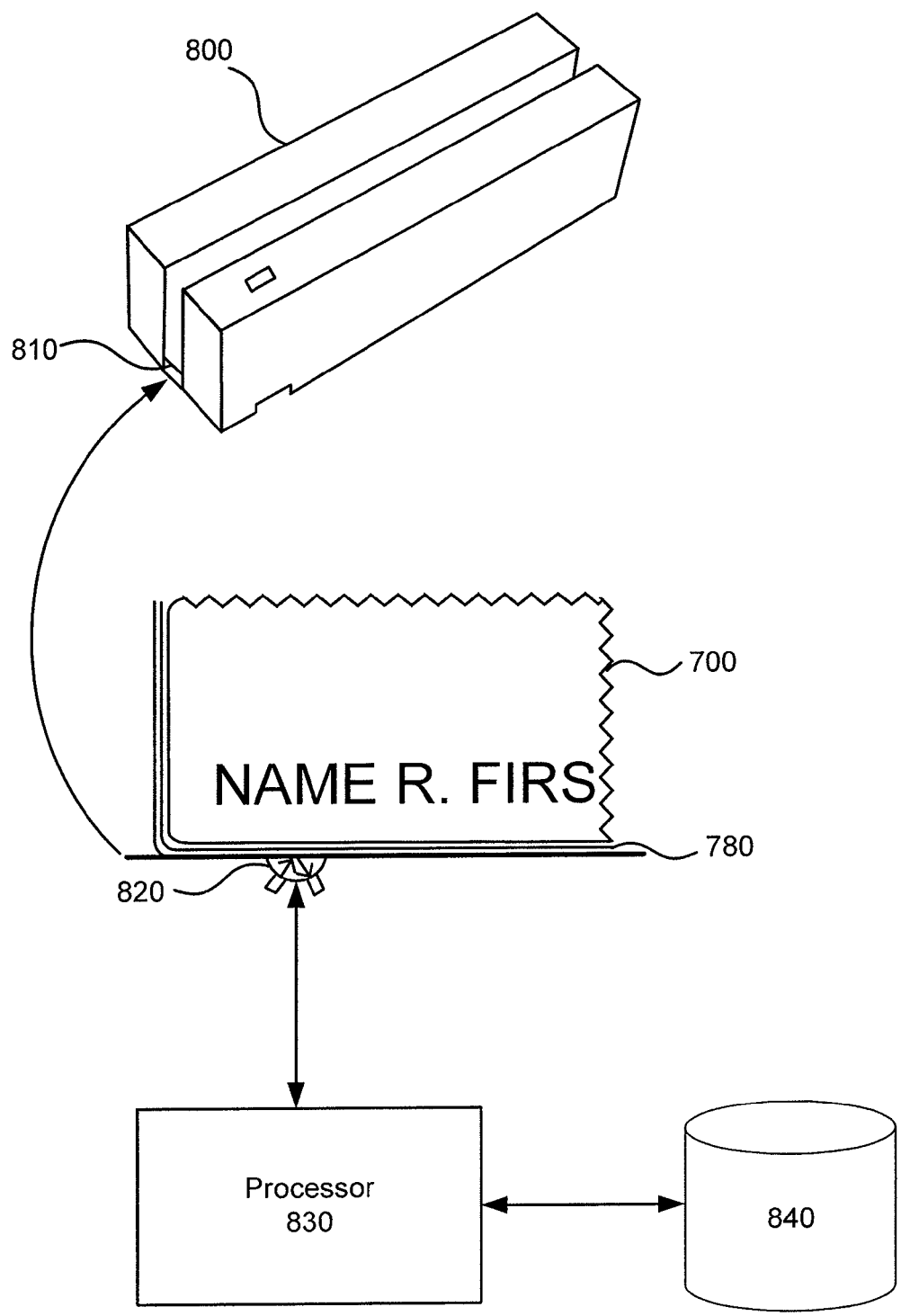
FIG. 8 depicts an apparatus for detecting edge features of a fissure pattern in a portable consumer device according to an embodiment of the present invention.

FIG. 8 depicts a card reader 810 with an edge feature detection sensor 820 according to one embodiment of the present invention. In one embodiment, edge feature detection sensor 820 is in the bottom of slot 810 of a card reader 800. When card 700 is passed through card reader 800, edge feature detection sensor 820 detects the edge features including, but not limited to, solid regions 750 and voids 760. In various embodiments, edge feature detection sensor 820 measures the speed at which the card is swiped through card reader 800. In various embodiments, edge feature detection sensor 820 is connected to processor 830. Processor 830 processes the signal coming from edge feature detection sensor 820 into edge feature data and then compares it with the edge feature data associated with card 700 stored in data store 840. If the edge feature data detected from card 700 matches the edge feature data associated with card 700 in data store 840, then card 700 can be authenticated.

Figure 9:
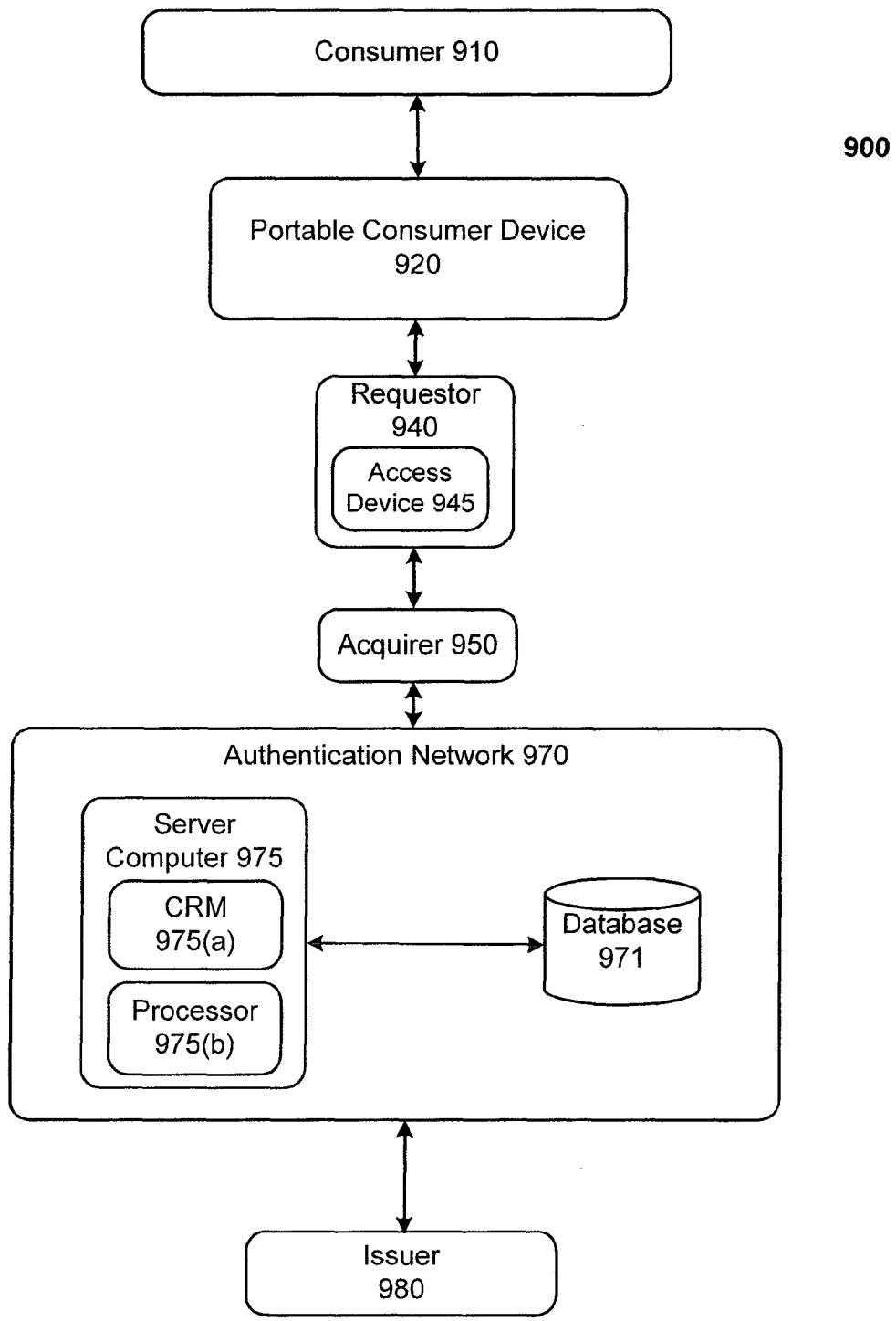
FIG. 9 is a block diagram of a system for authenticating a consumer using a portable consumer device with a fissure pattern according to an embodiment of the present invention.

FIG. 9 is a block diagram of an exemplary system 900 according to an embodiment of the invention. Although FIG. 9 shows a number of components, the system 900 according to embodiments of the invention may comprise any suitable combination or subset of such components.

The system 900 includes a consumer 910 that uses a portable consumer device 920 (e.g. a smart card or magnetic credit card) having a unique fissure pattern (not shown in FIG. 9). Specific examples of portable consumer devices are provided below.

The system 900 also includes a requestor 940 associated with an access device 945 (e.g., a point-of-sale terminal or card reader). The portable consumer device 920 can communicate with the access device 945 when an authentication is conducted. The access device 945 can be configured to detect the unique fissure pattern associated with the portable consumer device 920. The system 900 also includes an acquirer 950 (e.g., a bank or security company) associated with the requestor 940.

The system 900 also includes an authentication processing network 970 having a server computer 975 in communication with a database 971. The system 900 also includes an issuer

980 that maintains an account associated with the consumer 910 and the portable consumer device 920. Some examples of issuers may be a bank, a business entity such as a retail store, a security company or a governmental entity.

The requestor 940 can be any suitable type of entity. Some examples of requestors include a department store, a gas station, a drug store, a grocery store, a building management company, a university, etc. In practice, a request can be any entity that would like to authenticate a portable consumer device for various purposes. Some examples of contemplated purposes include payment authorization, building access or security screening, etc.

The access device 945 can be any suitable device capable of communicating with the portable consumer device 920. Examples of suitable devices include point-of-sale (POS) terminals, mobile phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, websites, and the like. Access device 945 may use any suitable contact or contactless mode of operation to communicate data to and from portable consumer device 920. In addition, access device 945 may use any suitable mode of operation to detect the fissure pattern contained in portable consumer device 920.

The payment authentication processing network 970 may include data processing subsystems, networks, and operations used to support and deliver authorization services, exception file services, and clearing and settlement services. An exemplary authentication processing network 970 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization request messages and a Base II system which performs clearing and settlement services.

In FIG. 9, the authentication processing network 970 includes a server computer 975 which is an example of a back end computer. Although FIG. 9 shows the server computer 975 residing in the payment processing network 970, it may alternatively reside at the issuer 980 in other embodiments of the invention.

A "server computer" can refer to a computer or cluster of computers. For example, the server computer 975 can be a large mainframe, a minicomputer cluster, or a group of servers functioning as a unit. In one example, the server computer 975 may be a database server coupled to a Web server (not shown). The authentication processing network 970 may use any suitable wired or wireless network, including the Internet.

As shown in FIG. 9, the server computer 975 has a CRM 975(*a*) in communication with a processor 975(*b*). The CRM 975(*a*) comprises code for performing the functions of server computer 975, while the processor 975(*b*) executes the code to perform the functions of server computer 975. Some examples of code stored in the CRM 975(*a*) include code for analyzing and comparing fissure pattern data from access device 945, code for receiving user input data from the consumer 910, code for retrieving fissure pattern data from database 971, etc. The code stored on the CRM 975(*a*) could also be stored on a computer readable medium residing in the portable consumer device 920, the access device 945 or a computer at the issuer 980, as any of these devices may be used to receive fissure pattern data from access device and database 971.

The authentication processing network 970 also includes a database 971 in communication with the server computer 975. The fissure pattern data from when a portable consumer device is created or activated can be temporarily or permanently stored in the database 971.

One embodiment of the present invention comprises a method for using the portable consumer device 920 with a unique fissure pattern to obtain authorization for a particular transaction. According to one embodiment of the present invention, the consumer 910 presents the portable consumer device 920 to the requestor 940. The particular transaction can comprise many different types of transactions and the few discussed herein and should be considered exemplary and should in no way be viewed as limiting the present invention.

In various embodiments, the transaction that consumer 910 may want to engage in is a purchase for which he or she seeks authorization to make a payment for the purchase with a consumer payment account (e.g. credit or debit account) associated with the portable consumer device 920. In various other embodiments, the consumer 910 may want access to a controlled access area, such as a secure building or room, and is seeking authorization to enter based on the clearance or permission credentials associated with the portable consumer device 920. In various embodiments, the portable consumer device 920 is an access card that can be carried in the consumers 910's pocket or wallet or on a lanyard.

In some embodiments, presenting the portable consumer device 920 comprises inserting into or otherwise positioning the portable consumer device 920 on the access device 945 of the requestor 940 so the portable consumer device 920 can communicate with or the fissure pattern can be detected by the access device 945. The access device 945 may comprise components of the fissure detection system shown in FIG. 6.

After the access device 945 receives fissure data and sends it to the to the acquirer 950, and then to the authentication network 970. The fissure data may be embedded in an authorization request message requesting authorization for the transaction. In other embodiments, the access device 945 sends the fissure data and/or the authorization request message directly to authentication network 970.

After the authentication network 970 receives the fissure data, the server computer 975(*a*) determines if the portable consumer device 920 is authentic, by comparing the received fissure data with previously stored fissure data in the database 971. If the portable consumer device is considered to be authentic or is not considered to be authentic, then the server computer 975 (including the computer readable medium 975 (*a*) and the processor 975(*b*)), can send this information to the issuer 980 so that the issuer 980 can determine whether to approve or deny the transaction. The computer readable medium 975(*a*) may comprise code for receiving a first set of data regarding the unique fissure pattern associated with the portable consumer device, code for comparing the first set of data regarding the unique fissure pattern associated with the portable consumer device with a second set of data regarding the unique fissure pattern associated with the portable consumer device stored in a database, and code for sending an authorization response message based on whether the first set of data regarding the unique fissure pattern associated with the portable consumer device matches the second set of data regarding the unique fissure pattern associated with the portable consumer device stored the database.

The issuer 980 can receive the authorization request message and can determine if the transaction should be approved or denied. After it makes this decision, it can send an authorization response message back to the access device 945 via the server computer 975 in the authentication network 970 informing the requestor 940 and the consumer 910 as to whether or not the transaction is approved.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A portable consumer device comprising:
   a substrate layer; and
   a diamond-based material layer comprising diamond disposed on the substrate layer, wherein the diamond-based material layer comprises intentionally created unique and random patterns, wherein the unique and random patterns comprise intentionally created random cracks in the diamond-based material layer, wherein the intentionally created random cracks create a distinctive signature specific to the intentionally created random cracks in the diamond-based material layer of the device, and wherein the distinctive signature of the portable consumer device is operable to authenticate a consumer carrying the portable consumer device by comparison of the signature obtained directly from the portable consumer device with a previously registered signature of the portable consumer device.

2. The portable consumer device of claim 1 wherein the diamond-based material layer further comprises a chemical vapor deposition (CVD) diamond or a high-pressure high-temperature (HPHT) diamond.

3. The portable consumer device of claim 1 wherein the unique and random patterns comprise crystal zone boundaries.

4. The portable consumer device of claim 1 wherein the distinctive signature is a heat dissipation signature.

5. The portable consumer device of claim 1 wherein the substrate layer includes plastic, resin, or metal.

6. The portable consumer device of claim 1 wherein the intentionally created random cracks in the diamond-based material layer can be detected using visible light imaging.

7. The portable consumer device of claim 1 wherein the intentionally created random cracks in the diamond-based material layer can be detected using non-visible radiation imaging.

8. The portable consumer device of claim 7 wherein the substrate layer is at least partially translucent to ultra violet light and the diamond-based material layer is opaque to ultra violet light.

9. The portable consumer device of claim 7 wherein the substrate layer is at least partially translucent to infrared light and the diamond-based material layer is opaque to infrared light.

* * * * *